US008667771B2

(12) United States Patent
Williams

(10) Patent No.: US 8,667,771 B2
(45) Date of Patent: Mar. 11, 2014

(54) MOWER RAKING SYSTEM

(76) Inventor: Anthony Williams, Tallahassee, FL (US)

(*) Notice: Subject to any disclaimer, the term of this patent is extended or adjusted under 35 U.S.C. 154(b) by 70 days.

(21) Appl. No.: 13/301,760

(22) Filed: Nov. 21, 2011

(65) Prior Publication Data
US 2013/0125522 A1 May 23, 2013

(51) Int. Cl.
A01D 43/02 (2006.01)

(52) U.S. Cl.
USPC .................. 56/193; 56/12.4; 56/12.5; 56/16.6

(58) Field of Classification Search
USPC ........ 56/1–5, 13.5, 13.9, 14.5, 193, 194, 202, 56/320.2, 12.4, 12.5, 16.6
See application file for complete search history.

(56) References Cited

U.S. PATENT DOCUMENTS

| | | | | |
|---|---|---|---|---|
| 661,081 A * | 11/1900 | Sellstrom | | 56/193 |
| 2,670,486 A * | 3/1954 | Daniell | | 15/79.1 |
| 3,134,118 A * | 5/1964 | Choninard | | 15/79.1 |
| 3,183,653 A * | 5/1965 | Cromwell | | 56/12.7 |
| 3,481,123 A * | 12/1969 | Lessig | | 56/17.5 |
| 3,664,099 A * | 5/1972 | Chouinard | | 56/13.3 |
| 3,668,846 A * | 6/1972 | Knight | | 56/205 |
| 3,753,341 A | 8/1973 | Berg, Jr. | | |
| 3,946,543 A | 3/1976 | Templeton | | |
| 5,134,838 A * | 8/1992 | Swisher et al. | | 56/16.6 |
| 5,197,265 A | 3/1993 | Hiratsuna | | |
| 5,269,127 A | 12/1993 | Miles, Jr. | | |
| 5,375,399 A * | 12/1994 | Kraft | | 56/16.7 |
| 7,303,025 B2 | 12/2007 | Mayer | | |
| 7,762,052 B2 * | 7/2010 | Dunning et al. | | 56/344 |
| 2004/0007402 A1 | 1/2004 | Kujawa | | |
| 2008/0105445 A1 | 5/2008 | Dayton | | |

* cited by examiner

Primary Examiner — Alicia Torres
(74) Attorney, Agent, or Firm — Gulf Coast Intellectual Property Group

(57) ABSTRACT

A system comprises a first housing configured to enable grass to extend into the first housing. A grass cutting unit is housed within the first housing. A discharge chute is joined to a rear portion of the first housing for directing grass cuttings away from the first housing. A bag unit is configured for collecting the grass cuttings from the discharge chute. A second housing is joined to a rear portion of the first housing and positioned below the discharge chute. A rake device is housed within the second housing. The rake device comprises rake tines being configured for rotating below the second housing bottom for transferring debris to the bag unit. A handle unit is joined to the second housing. The handle unit is configured for enabling an operator to control operations of the system. A plurality of wheels is joined to the first housing and the second housing.

16 Claims, 4 Drawing Sheets

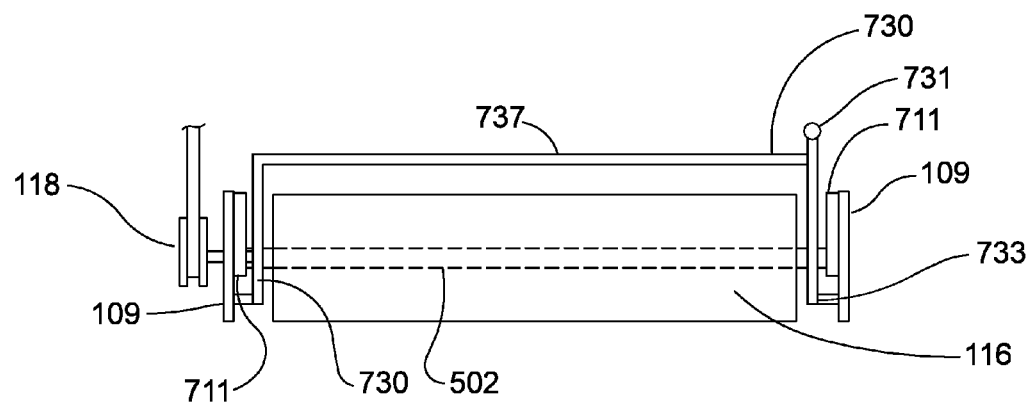
Figure 7A
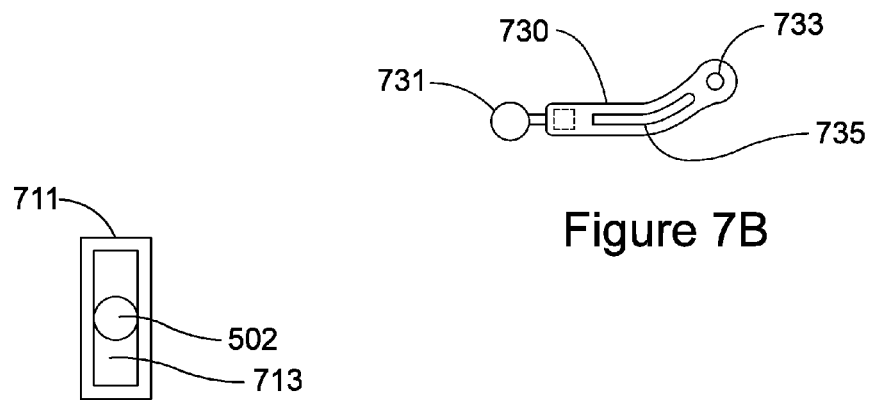
Figure 7B
Figure 7C

MOWER RAKING SYSTEM

CROSS-REFERENCE TO RELATED APPLICATIONS

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to mowers of the type used to shear grasses growing on a ground surface. More particularly, the invention relates to a mower raking system.

BACKGROUND OF THE INVENTION

A rotary lawnmower cuts grass by rotating a cutting blade along the grass, the cutting blade being contained in a housing with an opening at the bottom. Such lawnmowers include those designed to be used for containing the expelled grass and other debris in a bag.

A bagging lawnmower stores the grass cut by the cutting blade (i.e., the cut grass) in a bag or another cut grass storage container.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 7A, 7B, and 7C illustrate an example lever system for controlling height of rake device for mower raking system as described with reference to FIGS. 1-6, in accordance with an embodiment of the present invention.

Figure 1:
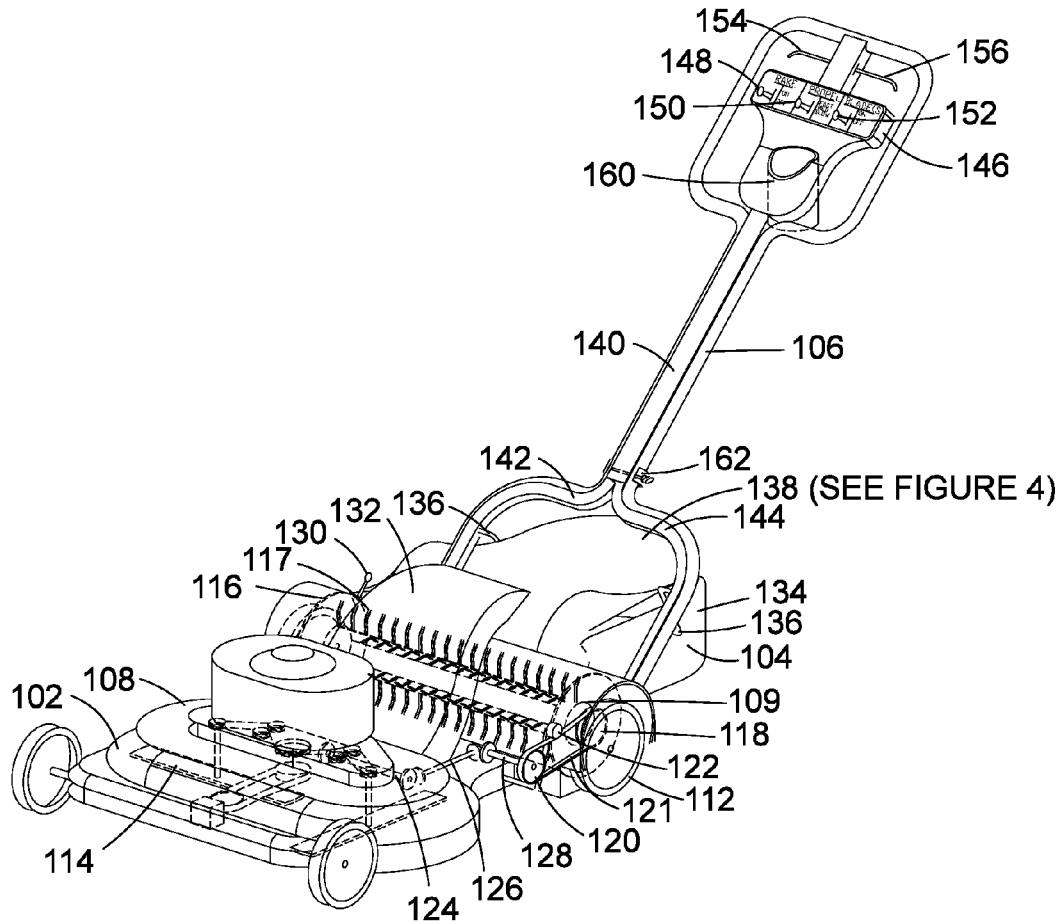
FIG. 1 illustrates an example mower raking system, in accordance with an embodiment of the present invention.

Unless otherwise indicated illustrations in the figures are not necessarily drawn to scale.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Embodiments of the present invention will be described for providing a mower raking system. Mower raking system provides rotating rake device for raking grass and other debris into a bag. Rake device may be adjusted for various height differentials as compared to mower housing. Operation of rake device may be configured via a control device (e.g. knob) located on handle. Enablement/disablement of rake device may be configured via control device. Operational speed for rake device may also be configured via control device. Control devices and respective control mechanisms associated with operation of mower may be connected via cables. Cables may be located interior to handle in order to prevent interference from outside entities (e.g. tree limbs).

FIG. 1 illustrates an example mower raking system, in accordance with an embodiment of the present invention.

A mower raking system 100 includes a mower 102, a bag 104 and a handle 106.

Mower 102 operates to cut or mow grass (e.g. lawn) while raking cut grass and other debris (e.g. leaves).

Bag 104 accumulates expelled grass and other debris cut and raked by mower 102.

Handle 106 provides a means for user to guide and control operation of mower raking system 100.

Mower 102 includes a mower housing 108, a rake housing 109, a motor 110, a multiplicity of wheels with a sampling denoted as a wheel 112, a multiplicity of blades with a sampling denoted as a blade 114, a rake device 116, a multiplicity of rake tines with a sampling denoted as a tine 117, a rake drum pulley 118, a rake pulley 120, a belt 121, a rake pulley idle arm 122, a rake drum shaft 124, a rake pulley drive shaft 126, a rake pulley axel 128, a rake drum housing control 130 and a discharge chute 132.

Mower housing 108 provides assembly support and protection from blades and expelled objects.

Housing 109 provides housing support for wheels (e.g. wheel 112) and for rake device 116.

Motor 110 provides mechanical power for mower 102.

Wheel 112 enables movement of mower 102.

Blade 114 provides cutting mechanism for grass and other debris (e.g. leaves).

Rake device 116 provides a raking mechanism for lifting and propelling grass and other objects out of rake housing 116. Discharge chute device 132 provides mechanism for passing grass and other objects out of mower housing 108

Tine 117 provides mechanism for raking grass and other objects propelled from mower 102.

Rake drum pulley 118 enables application of mechanical force for rotating rake device 116.

Rake pulley 120 enables application of mechanical force from motor 110 to rake drum pulley 118.

Belt 121 enables application of mechanical force from rake pulley 120 to rake drum pulley 118.

Rake pulley idle arm 122 enables tightening and loosening of tension applied to belt 121.

Rake drum shaft 124 enables application of mechanical force from motor 110 to rake pulley drive shaft 126.

Rake pulley drive shaft 126 enables application of mechanical force from rake drive shaft 124 to rake pulley axel 128.

Rake pulley axel 128 enables application of mechanical force from rake pulley drum shaft 126 to rake pulley 120.

Rake drum housing control 130 provides configuration for the height of operation for rake device 116.

Discharge chute 132 provides a conduit for grass and other objects to be propelled from mower housing 108 to bag 104.

Bag 104 includes a bag housing 134, a bag support 136 and a clip latch 138.

Bag housing 134 provides mechanical support for housing and provides containment for grass and other objects propelled into bag 104.

Bag support 136 provides mechanical support between handle 106 and bag 104.

Clip latch 138 provides a means for removal of grass and other objects contained within bag 104.

Handle 106 includes an upper cable chute 140, a right lower cable chute 142, a left lower cable chute 144 and a main control panel 146.

Upper cable chute 140, right lower cable chute 142 and left lower cable chute 144 provide conduits for cables connecting between main control panel 146 and mechanisms associated with the operation and configuration of mower 102.

Adjustment means 162 provides means for raising or lowering upper portion of handle 106.

Cup holder 160 provides means for holding a beverage container.

Main control panel 146 provides support for configuration mechanisms associated with the operation and configuration of mower 102.

Main control panel 146 includes a rake control knob 148, a speed control knob 150, a blade control knob 152, a self-propel control lever 154 and a motor control lever 156.

Rake control knob 148 configures engagement and speed of operation for rake device 116.

Speed control knob 150 configures speed of motion for mower raking system 100.

Blade control knob 152 configures engagement and disengagement for operation of blade 114.

Self-propel control lever 154 configures engagement and disengagement for motion of mower raking system 100.

Motor control lever 156 enables or disables operation of mower 102.

Rake device 116 may be configured as a hollow round cylinder. Furthermore, rake tines or prongs (e.g. tine 117) may be attached to rake device 116. Rake device 116 may be seated internally in a slot (shown later in FIG. 4) located on the left and right side of housing 109. Rake device 116 physically connects to rake drum pulley 118 when inserted into slot. Rake drum pulley 118 is located between wheel 112 and rake device 116.

Mechanical power for rotating rake device 116 is sourced via motor 110. Mechanical power is delivered from motor 110 to rake device 116 via rake drum shaft 124, rake pulley drive shaft 126, rake pulley axel 128, rake drum pulley 118, belt 121 and rake drum pulley 118. Rake pulley idle arm 122 located between rake pulley 120 and rake drum pulley 118 and contacting belt 121 provides force for tensioning belt 121. Furthermore, tensioning of belt 121 enables transference of mechanical power from rake pulley 120 to rake drum pulley 118. Furthermore, as a non-limiting example, rake pulley idle arm 122 may be spring-loaded. Rake pulley idle arm 122 may be engaged and configured via rake control knob 148. A cable (shown later in FIG. 6) concealed and housed within upper cable chute 140 and left lower cable chute 144 provides a physical connection between rake control knob 148 and rake pulley idle arm 122. Furthermore, the tension applied to belt 121 by rake pulley idle arm 122 controls the angular velocity of rake device 116.

The height for rake device 116 relative to the mower housing 108 and to the ground is configurable. Non-limiting examples for heights configurable for rake device 116 include low, medium and high. The height for rake device 116 may be configured via rake drum housing control 130. Rake drum housing control 130 configures a rod (shown later in FIG. 5) located at the center axis of rake device 116 for controlling the height of rake device 116.

Figure 2:
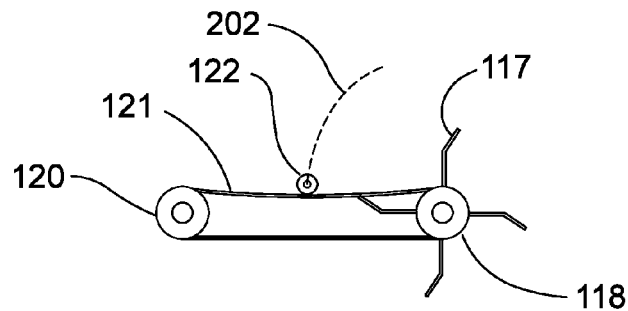
FIG. 2 illustrates an example rake rotation mechanism for the mower raking system as described with reference to FIG. 1, in accordance with an embodiment of the present invention.

FIG. 2 illustrates an example rake rotation mechanism for the mower raking system as described with reference to FIG. 1, in accordance with an embodiment of the present invention.

Belt 121 extends around rake pulley 120 and rake drum pulley 118 for transferring mechanical power from rake pulley 120 to rake drum pulley 118.

Rake pulley idle arm 122 applies force to belt 121 to increase or decrease tension for belt 121. Increased tension for belt 121 provides increased transfer of power from rake pulley 120 to rake drum pulley 118. Decreased tension for belt 121 provides decreased transfer of power from rake pulley 120 to rake drum pulley 118.

A rake pulley idle arm cable 202 provides for increased or decreased force applied to rake pulley idle arm 122. Rake pulley idle arm cable 202 connects to rake control knob 148 (FIG. 1). Rake pulley idle arm cable 202 traverses from rake control knob 148 through upper cable chute 140 and through left lower cable chute 144 to rake pulley idle arm 122.

Figure 3:
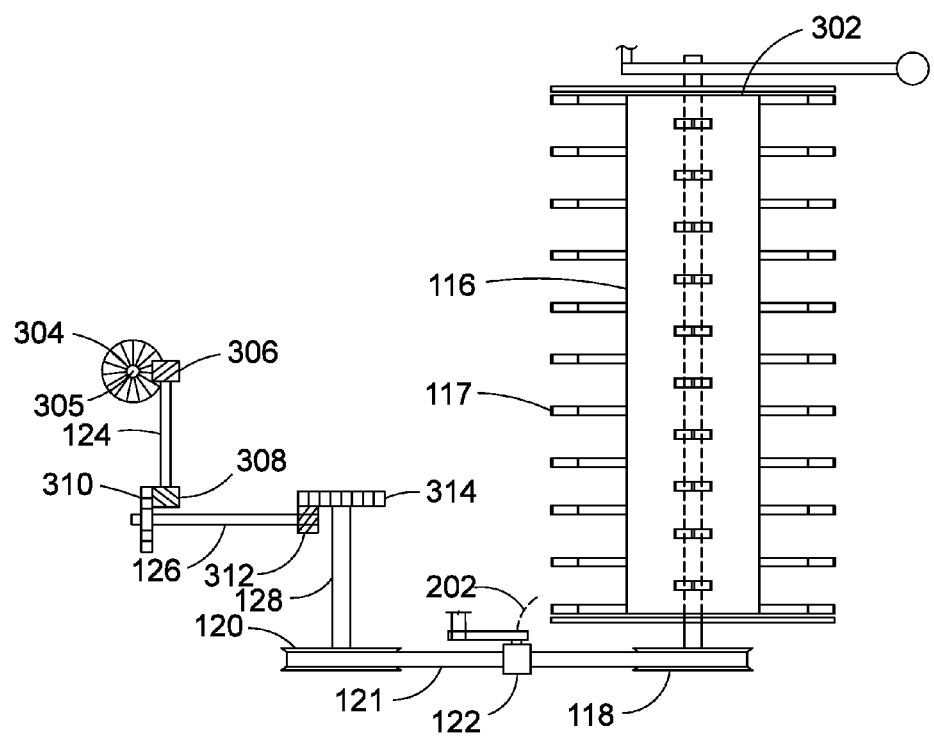
FIG. 3 illustrates an example mower raking rotation mechanism for the mower raking system as described with reference to FIGS. 1-2, in accordance with an embodiment of the present invention.

FIG. 3 illustrates an example mower raking rotation mechanism for the mower raking system as described with reference to FIGS. 1-2, in accordance with an embodiment of the present invention.

A rake drum 302 supports protruding tines (e.g. tine 117). Rake drum 302 and associated tines rotate propelling grass and other objects from mower 102 (FIG. 1).

A gear 304 connects to a drive shaft 305 of motor 110 (FIG. 1).

A gear 306 connects to first end of rake drum shaft 124.

A gear 308 connects to second end of rake drum shaft 124.

A gear 310 connects to first end of rake pulley drive shaft 126.

A gear 312 connects to a second end of rake pulley drive shaft 126.

A gear 314 connects to rake pulley axel 128.

Rake pulley 120 connects to rake pulley axel 128.

Rake drum pulley 118, rake pulley 120, belt 121, rake pulley idle arm 122 and rake pulley idle arm cable 202 operate as described with reference to FIG. 2.

In operation, gear 304 rotates at an angular velocity as provided by drive shaft 305.

Gear 304 transfers mechanical power from motor 110 (FIG. 1) to rake drum shaft 124 via gear 306.

Gear 308 transfers mechanical power from rake drum shaft 124 to rake pulley drive shaft 126 via gear 310.

Gear 312 transfers mechanical power from rake pulley drive shaft 126 to rake pulley axel 128 via gear 314.

Rake pulley 120 may transfer mechanical power from rake pulley axel 128 to belt 121.

Belt 121 may transfer mechanical power from rake pulley 120 to rake drum pulley 118.

Rake drum pulley 118 may transfer mechanical power from belt 121 to rake drum 302.

The amount of mechanical power transferred from rake pulley 120 to rake drum pulley 118 is configured via rake pulley idle arm 122.

Rake tines (e.g. tine 117) travels at an angular velocity as provided by rake drum 302.

Rake tines (e.g. tine 117) operate to project grass and other objects.

Figure 4:
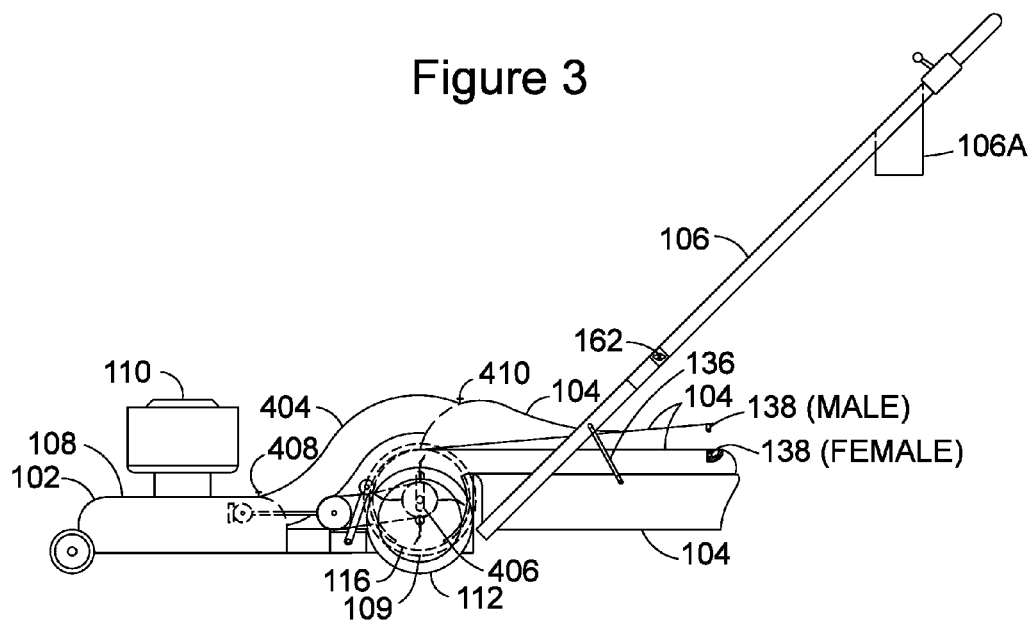
FIG. 4 illustrates an example mower raking mechanism for the mower raking system as described with reference to FIGS. 1-3, in accordance with an embodiment of the present invention.

FIG. 4 illustrates an example mower raking mechanism for the mower raking system as described with reference to FIGS. 1-3, in accordance with an embodiment of the present invention.

Rake housing 109 connects to mower housing 108 for receiving grass and other objects propelled by rake device 116.

A chute 404 connects to a rake housing 109 and receives grass and other objects from rake housing 109.

Bag 104 connects to chute 404 and receives grass and other objects from chute 404. In some embodiments, bag 104 includes sub-bag 104A, a transparent recyclable, biodegradable and removable bag insert. Sub-bag 104A is secured inside of the bag 104 by way of attachment clips. Grass and other objects are received and dispersed into the bag 104 by way of chute 404. To empty bag 104 or sub-bag 104A, respectively, the clip latch 138 locate at the top-rear quadrant of bag 104 is unlatched and the top portion of bag 104 is opened, swinging on the hinges (not shown) at the back side of the bag or the front side of the bag 104, which is secured at the rear side of the rake housing 109.

A slot 406 receives and secures rake device 116. Rake device 116 may be removed or inserted into mower housing 108 via slot 406.

Chute 404 is attached to rear of mower housing 108 via an attachment device 408. As a non-limiting example, attachment device 408 may be a wing nut.

Intake end of chute 404 connects to the top-rear-center area of housing 108. Chute 404 provides an upward trajectory for discharging grass and other debris from mower 102. Furthermore, outfall end of chute 404 connects to the top-front-center area of chute intake area of bag 104. Outfall end of chute 404 connects to bag 104 via a clip device 410. Chute 404 provides for the collection and transference of grass and debris to bag 104.

Chute 404 is detachable and may be removed when rake device 116 is used alone and not configured for operation with mower 102. In this instance, the cutting system is not engaged and used. Only the raking system is engaged. In this event, panels (not shown) may be attached to block the discharge opening of mower housing 108. Removal of chute 404 may be at the operator's discretion. A panel (not shown) may be configured for replacement of housing 109 when rake device 116 is not configured for operation for mower 102. As a non-limiting example, panel may be attached to mower housing 108 via a wing nut. Furthermore, panel provides a covering for the discharge opening (not shown) located in mower housing 108.

Bag 104 is attached to the top rear of rake housing 109, 116. As a non-limiting example, bag 104 may be transparent to enable viewing of contents. Furthermore, viewing of contents enables determination for the capacity status of bag 104. As an example, a user may view the contents located within bag 104 in order to determine if the contents need to be removed, or not. In some embodiments, the user may view the contents of sub-bag 104A. The intake opening for bag 104 is aligned with the discharge opening for rake device 116. The discharged matter (e.g. grass clippings, leaves, etc.) propelled from rake device 116 through the rake discharge opening is transferred into bag 104. The discharged matter is propelled upward and toward the intake opening of bag 104. Furthermore, bag 104 is shaped such that a transitioning curvature in the top of bag 104 evenly conveys and disperses the matter into bag 104. As a non-limiting example, the covering material for bag 104 may be constructed of transparent heavy-duty plastic. The transparency of bag 104 provides a user with the capability to monitor the amount of matter contained within bag 104 or sub-bag 104A. Bag 104 may be opened from the top-rear of bag 104 via clip latch 138. Bag support 136 supports the weight of bag 104 by handle 106.

Figure 5:
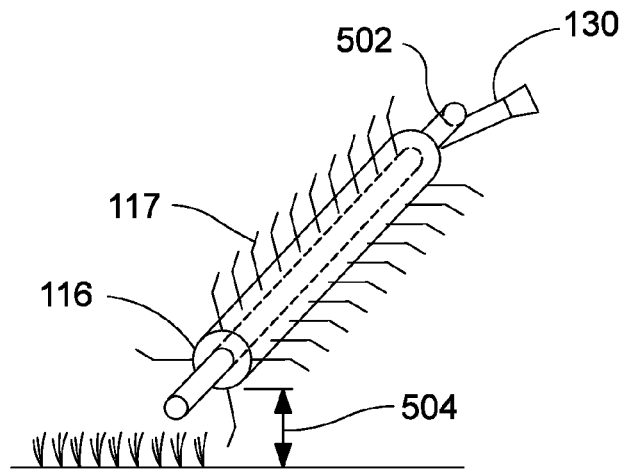
FIG. 5 illustrates an example lever system for controlling height of rake device for mower raking system as described with reference to FIGS. 1-4, in accordance with an embodiment of the present invention.

FIG. 5 illustrates an example lever system for controlling height of rake device for mower raking system as described with reference to FIGS. 1-4, in accordance with an embodiment of the present invention.

A rod 502 running through the axis of rake device 116 (FIG. 1) supports rake device 116 (FIG. 1) at a height 504 above the ground.

Rake drum housing control 130 (FIG. 1) operates to configure height 504 by manipulating rod 502.

Figure 6:
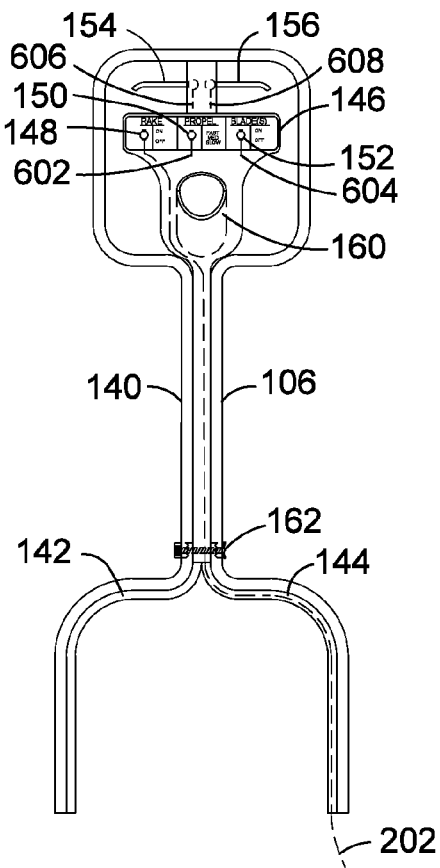
FIG. 6 illustrates an example handle for the mower raking system as described with reference to FIGS. 1-5, in accordance with an embodiment of the present invention.

FIG. 6 illustrates an example handle for the mower raking system as described with reference to FIGS. 1-5, in accordance with an embodiment of the present invention. Handle 106 includes a cup/bottle holder 160 to hold fluid containers for the operator during the course of mowing/raking the lawn. Near the junction point of the upper cable chute 140 and lower cable chutes 142 and 144, an adjustment means 162 enables the lowering and raising of the upper portion of handle 106 for the purpose of adjustment for operator comfort and convenience. In a non-limiting example, adjustment means 162 comprises a wing nut, which releases the pressure that locks rotating grip teeth. Release of the grip teeth allows the upper portion of handle 106 to be rotated higher or lower.

Rake control knob 148 connects to rake pulley idle arm cable 202 (FIGS. 2-3).

Speed control knob 150 connects to a speed control cable 602.

Blade control knob 152 connects to a blade control cable 604.

Self-propel control lever 154 connects to a self-propel control cable 606.

Motor control lever 156 connects to a motor control cable 608.

Speed control cable 602 connects to the self-propelled portion (not shown) of mower 102 for controlling the velocity of mower 102 (FIG. 1).

Blade control cable 604 connects to the blade control portion (not shown) for controlling the operation of the blades (e.g. blade 114 (FIG. 1)).

Self-propel control cable 606 connects to the self-propelled portion (not shown) of mower 102 (FIG. 1) for controlling the engagement or disengagement for propelling mower 102 (FIG. 1).

Motor control cable 608 connects to motor 110 (FIG. 1) for controlling the on/off configuration for motor 110 (FIG. 1).

Handle 106 connects to the rear of mower 102. As a non-limiting example, handle 106 may be attached to rear of mower 102 via a connection assembly. Furthermore, connection assembly may include a screw (not shown) and nut (not shown) with screw inserted into aligned holes (not shown) located in base point of handle 106 and in mower housing 108.

Upper cable chute 140, right lower cable chute 142 and left lower cable chute 144 house connection cables and prevent connection cables from interference from external entities (e.g. tree limbs). Connection cables (e.g. speed control cable 602) provide connection from knobs and levers to configuration mechanisms associated with mower 102. Connection cables may be accessed via main control panel 146 and/or upper cable chute 140 by removal of screws inserted into underside. Furthermore, removal of screws separates main control panel 146 and upper cable chute 140 for cable maintenance.

Upper cable chute 140 and right lower cable chute 142 or left lower cable chute 144 may house self-propel control cable 606. Furthermore, self-propel control cable extends from self-propel control lever 154 to the propelling unit (not shown) located at the front area of mower 102.

Upper cable chute 140 and right lower cable chute 142 or left lower cable chute 144 may house blade control cable 604. Blade control cable 604 extends from blade control knob 152 to the idle pulley (not shown) associated with enabling/disabling operation of the blades (e.g. blade 114 (FIG. 1)). This idle pulley is engaged/disengaged via the blade control knob 152. The ability to rake is available when the blades are not engaged. Furthermore, the ability to cut and rake is available when the blades are engaged.

Upper cable chute 140 and right lower cable chute 142 or left lower cable chute 144 may house motor control cable 608.

Motor control cable 608 extends from motor control lever 156 to the enable/disable configuration for mower 102. Furthermore, motor control cable 608 may traverse through a tube located in the wheel housing (not shown) for connection to motor 110.

FIGS. 7A, 7B, and 7C illustrate an example lever system for controlling height of rake device for mower raking system as described with reference to FIGS. 1-6, in accordance with an embodiment of the present invention. Rake device 116 may be positioned vertically for adjustment of raking intensity. This may be accomplished by way of vertical positioning of rod 502 running through the axis of rake device 116. Rod 502 is secured at both sides of the rake housing 109, through the vertical stabilization bracket 711. Vertical adjustment of the rake device 116 may be initiated by way of rake drum height lever 731 of rake drum lever bracket 730. Rod 502 extends through cylinder axel floatation guide 735 of rake drum lever bracket 730. As rake drum lever bracket 730 is vertically adjusted, it is rotated about lever bar rotation base 733. Vertical movement of rake drum lever bracket 730 engages height adjustment cross bar 737. Height adjustment cross bar 737 is attached at the opposite side of rake device 116 to that side's rake drum lever bracket 730. Rod 502 is stabilized during vertical adjustment by vertical adjustment guide 713 of vertical stabilization bracket 711.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of mower raking systems according to the present invention will be apparent to those skilled in the art. The invention has been described above by way of illustration, and the specific embodiments disclosed are not intended to limit the invention to the particular forms disclosed. For example, the particular implementation of the raking device may vary depending upon the particular type or width of mower used. The mower raking system described in the foregoing was directed to lawn implementations; however, similar techniques for other types of power equipment implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A mower having an integrated raking system comprising:

a mower housing, said mower housing having at least one wall forming an interior volume, said mower housing having a bottom opening, said mower housing having a front end and a rear end, said mower housing having a first wheel and a second wheel secured thereto;

a motor, said motor being superposed said mower housing, said motor further including a drive shaft;

at least one blade, said at least one blade being disposed within said interior volume of said mower housing, said at least one blade being operably coupled to said motor;

a rake housing, said rake housing being joined to said mower housing, said rake housing be integrally formed with said rear end of said mower housing, said rake housing having an interior volume with a bottom opening, said rake housing having a first side and a second side, said rake housing having a wheel mounted on said first side and said second side;

a rake drum, said rake drum being cylindrical in shape, said rake drum being rotatably mounted within said rake housing, said rake drum further including a support rod centrally disposed therethrough, said support rod having a first end and a second end, said first end and said second end of said support rod extending beyond opposite ends of said rake drum, said rake drum including a plurality of tines secured thereto, said plurality of tines extending outward from said rake drum;

a rake drum drive assembly, said rake drum drive assembly operable to couple said motor and said rake drum, said rake drum drive assembly further including a first gear, said first gear being operably coupled to said drive shaft of said motor, said rake drum drive assembly further including a second gear, said second gear being operably coupled to said first gear, said second gear having a shaft coupled thereto, said shaft having a first end and a second end, said second gear being secured to said first end of said shaft, said shaft having a third gear secured to said second end thereof, said rake drum assembly further including a fourth gear, said fourth gear operably coupled to said third gear, said fourth gear being secured to a rake pulley drive shaft, said rake pulley drive shaft having a first end and a second end, said fourth gear being proximate said first end, said rake pulley drive shaft having a fifth gear secured to said second end, said fifth gear operably coupled to a sixth gear, said sixth gear operably coupled to a rake pulley axle proximate a first end, said rake pulley axle further including a second end, said second end of said rake pulley axle having a rake pulley secured thereto, said rake drum drive assembly further including a rake drum pulley, said rake drum pulley being operably coupled to said support rod of said rake drum, said rake drum drive assembly further including a belt, said belt operably coupling said rake drum pulley and said rake pulley;

a handle, said handle operably coupled to said rake housing and extending upward therefrom, said handle having a lower portion and an upper portion, said lower portion of said handle including a first segment and a second segment, said first segment and said second segment coupled to said first side and said second side of said rake housing respectively;

a control center, said control center being secured to said upper portion of said handle; and wherein the mower is operable to cut grass while simultaneously rake the surface upon which the mower is being traversed.

2. The mower as recited in claim 1, and further including a bag compartment, said bag compartment formed with a plurality of walls operable to define an interior volume having a first opening and a second opening, said first opening of said bag compartment being operably coupled to said mower housing via a discharge chute, said second opening of said bag compartment being operably coupled to said rake housing, said bag compartment further including a bag releasably secured therein.

3. The mower as recited in claim 2, and further including a first vertical stability bracket and a second vertical stability bracket, said first vertical stability bracket being mounted within said interior volume of said rake housing proximate said first side, said second vertical stability bracket being secured within said interior volume of said rake housing proximate said second side, said first vertical support bracket operably coupled with said first end of said support rod of said rake drum, said second vertical support bracket being operably coupled with said second end of said support rod of said rake drum.

4. The mower as recited in claim 3, and further including a first rake drum lever bracket and a second rake drum lever bracket, said first rake drum lever bracket being adjacent said first vertical support bracket, said second rake drum lever bracket being adjacent said second vertical support bracket, said first rake drum lever bracket and said second rake drum lever bracket being rotatably mounted to said rake housing.

5. The mower as recited in claim 4, and further including a height adjustment cross bar, said height adjustment cross bar operably coupled intermediate said first rake drum lever bracket and said second rake drum lever bracket, said height adjustment cross bar position above said rake drum.

6. The mower as recited in claim 5, wherein said first rake drum lever bracket and said second rake drum lever bracket further include a slot, said slot operable to receive said support rod of said rake drum.

7. A combination lawn mower and raking device that is operable to simultaneously cut grass and rake the surface upon which the device is being traversed comprising:

a mower housing, said mower housing having at least one wall forming an interior volume, said mower housing having a bottom opening, said mower housing having a front end and a rear end, said mower housing having a first wheel and a second wheel secured thereto;

a motor, said motor being superposed said mower housing, said motor further including a drive shaft;

at least one blade, said at least one blade being disposed within said interior volume of said mower housing, said at least one blade being operably coupled to said motor;

a rake housing, said rake housing being joined to said mower housing, said rake housing be integrally formed with said rear end of said mower housing, said rake housing having an interior volume with a bottom opening, said rake housing having a first side and a second side, said rake housing having a wheel mounted on said first side and said second side;

a rake drum, said rake drum being cylindrical in shape, said rake drum being rotatably mounted within said rake housing, said rake drum further including a support rod centrally disposed therethrough, said support rod having a first end and a second end, said first end and said second end of said support rod extending beyond opposite ends of said rake drum, said rake drum including a plurality of tines secured thereto, said plurality of tines extending outward from said rake drum, said plurality of tines having a first portion and a second portion, said first portion being secured to said rake drum, said second portion being integrally formed with said first portion distal to said rake drum, said second portion being angular with respect to said first portion;

a rake drum drive assembly, said rake drum drive assembly operable to couple said motor and said rake drum, said rake drum drive assembly further including a first gear, said first gear being operably coupled to said drive shaft of said motor, said rake drum drive assembly further including a second gear, said second gear being operably coupled to said first gear, said second gear having a shaft coupled thereto, said shaft having a first end and a second end, said second gear being secured to said first end of said shaft, said shaft having a third gear secured to said second end thereof, said rake drum assembly further including a fourth gear, said fourth gear operably coupled to said third gear, said fourth gear being secured to a rake pulley drive shaft, said rake pulley drive shaft having a first end and a second end, said fourth gear being proximate said first end, said rake pulley drive shaft having a fifth gear secured to said second end, said fifth gear operably coupled to a sixth gear, said sixth gear operably coupled to a rake pulley axle proximate a first end, said rake pulley axle further including a second end, said second end of said rake pulley axle having a rake pulley secured thereto, said rake drum drive assembly further including a rake drum pulley, said rake drum pulley being operably coupled to said support rod of said rake drum, said rake drum drive assembly further including a belt, said belt operably coupling said rake drum pulley and said rake pulley;

a handle, said handle operably coupled to said rake housing and extending upward therefrom, said handle being substantially hollow so as to accommodate cables therein, said handle having a lower portion and an upper portion, said lower portion of said handle including a first segment and a second segment, said first segment and said second segment coupled to said first side and said second side of said rake housing respectively;

a control center, said control center being secured to said upper portion of said handle;

a bag compartment, said bag compartment formed with a plurality of walls operable to define an interior volume having a first opening and a second opening, said first opening of said bag compartment being operably coupled to said mower housing via a discharge chute, said bag compartment further including an inner bag releasably secured therein;

a first vertical stability bracket and a second vertical stability bracket, said first vertical stability bracket being mounted within said interior volume of said rake housing proximate said first side, said second vertical stability bracket being secured within said interior volume of said rake housing proximate said second side, said first vertical support bracket operably coupled with said first end of said support rod of said rake drum, said second vertical support bracket being operably coupled with said second end of said support rod of said rake drum.

8. The combination lawn mower and raking device as recited in claim 7, wherein said second portion of said plurality of tines is angled away from the direction of rotation of said rake drum.

9. The combination lawn mower and raking device as recited in claim 8, and further including a first rake drum lever bracket and a second rake drum lever bracket, said first rake drum lever bracket being adjacent said first vertical support bracket, said second rake drum lever bracket being adjacent said second vertical support bracket, said first rake drum lever bracket and said second rake drum lever bracket being angular in shape and having a slot therein, said slot operable to receive a portion of said support rod of said rake drum, said first rake drum lever bracket and said second rake drum lever bracket being rotatably mounted to said rake housing.

10. The combination lawn mower and raking device as recited in claim 9, and further including a height adjustment cross bar, said height adjustment cross bar operably coupled intermediate said first rake drum lever bracket and said second rake drum lever bracket, said height adjustment cross bar position above said rake drum.

11. The combination lawn mower and raking device as recited in claim 10, wherein said bag compartment further includes a plurality of clips, said plurality of clips configured to releasably secure said inner bag within said bag compartment.

12. The combination lawn mower and raking device as recited in claim 11, wherein said second opening of said bag compartment is operably coupled to said rake housing.

13. A combination lawn mower and raking device that is operable to be traversed across a lawn and simultaneously cut grass and rake the lawn comprising:
   a mower housing, said mower housing having at least one wall forming an interior volume, said mower housing having a bottom opening, said mower housing having a front end and a rear end, said mower housing having a first wheel and a second wheel secured thereto;
   a motor, said motor being superposed said mower housing, said motor further including a drive shaft;
   at least one blade, said at least one blade being disposed within said interior volume of said mower housing, said at least one blade being operably coupled to said motor;
   a rake housing, said rake housing being joined to said mower housing, said rake housing be integrally formed with said rear end of said mower housing, said rake housing having an interior volume with a bottom opening, said rake housing having a first side and a second side, said rake housing having a wheel mounted on said first side and said second side;
   a rake drum, said rake drum being cylindrical in shape, said rake drum being rotatably mounted within said rake housing, said rake drum further including a support rod centrally disposed therethrough, said support rod having a first end and a second end, said first end and said second end of said support rod extending beyond opposite ends of said rake drum, said rake drum including a plurality of tines secured thereto, said plurality of tines extending outward from said rake drum, said plurality of tines having a first portion and a second portion, said first portion being secured to said rake drum, said second portion being integrally formed with said first portion distal to said rake drum, said second portion being angular with respect to said first portion, wherein said second portion of said plurality of tines is angled away from the direction of rotation of said rake drum;
   a rake drum drive assembly, said rake drum drive assembly operable to couple said motor and said rake drum, said rake drum drive assembly further including a first gear, said first gear being operably coupled to said drive shaft of said motor, said rake drum drive assembly further including a second gear, said second gear being operably coupled to said first gear, said second gear having a shaft coupled thereto, said shaft having a first end and a second end, said second gear being secured to said first end of said shaft, said shaft having a third gear secured to said second end thereof, said rake drum assembly further including a fourth gear, said fourth gear operably coupled to said third gear, said fourth gear being secured to a rake pulley drive shaft, said rake pulley drive shaft having a first end and a second end, said fourth gear being proximate said first end, said rake pulley drive shaft having a fifth gear secured to said second end, said fifth gear operably coupled to a sixth gear, said sixth gear operably coupled to a rake pulley axle proximate a first end, said rake pulley axle further including a second end, said second end of said rake pulley axle having a rake pulley secured thereto, said rake drum drive assembly further including a rake drum pulley, said rake drum pulley being operably coupled to said support rod of said rake drum, said rake drum drive assembly further including a belt, said belt operably coupling said rake drum pulley and said rake pulley;
   a handle, said handle operably coupled to said rake housing and extending upward therefrom, said handle being substantially hollow so as to accommodate cables therein, said handle having a lower portion and an upper portion, said lower portion of said handle including a first segment and a second segment, said first segment and said second segment coupled to said first side and said second side of said rake housing respectively;
   a control center, said control center being secured to said upper portion of said handle;
   a bag compartment, said bag compartment formed with a plurality of walls operable to define an interior volume having a first opening and a second opening, said first opening of said bag compartment being operably coupled to said mower housing via a discharge chute, said bag compartment further including an inner bag releasably secured therein;
   a first vertical stability bracket and a second vertical stability bracket, said first vertical stability bracket being mounted within said interior volume of said rake housing proximate said first side, said second vertical stability bracket being secured within said interior volume of said rake housing proximate said second side, said first vertical support bracket operably coupled with said first end of said support rod of said rake drum, said second vertical support bracket being operably coupled with said second end of said support rod of said rake drum;
   a first rake drum lever bracket and a second rake drum lever bracket, said first rake drum lever bracket being adjacent said first vertical support bracket, said second rake drum lever bracket being adjacent said second vertical support bracket, said first rake drum lever bracket and said second rake drum lever bracket being angular in shape and having a slot therein, said slot operable to receive a portion of said support rod of said rake drum, said first rake drum lever bracket and said second rake drum lever bracket being rotatably mounted to said rake housing;
   a height adjustment cross bar, said height adjustment cross bar operably coupled intermediate said first rake drum lever bracket and said second rake drum lever bracket, said height adjustment cross bar position above said rake drum.

14. The combination lawn mower and raking device as recited in claim 13, and further including an idle arm, said idle arm being operably coupled with said belt.

15. The combination lawn mower and raking device as recited in claim 14, wherein said bag compartment further includes a plurality of clips, said plurality of clips configured to releasably secure said inner bag within said bag compartment.

16. The combination lawn mower and raking device as recited in claim 15, wherein said second opening of said bag compartment is operably coupled to said rake housing.

* * * * *